US005098018A

United States Patent [19]

Hadar et al.

[11] Patent Number: 5,098,018

[45] Date of Patent: Mar. 24, 1992

[54] CROP SPRAY APPARATUS HAVING INDEPENDENTLY CONTROLLED DRIVE ASSEMBLY, OPERATOR'S CAB AND SPRAY DEVICE

[75] Inventors: Ezra Hadar; David Tsur; Zev Rotem-Bar, all of Kibbuts Degania Bet, Israel

[73] Assignee: Kibbuts Degania Bet, Kibbuts Degania Bet, Israel

[21] Appl. No.: 589,549

[22] Filed: Sep. 28, 1990

[51] Int. Cl.$^5$ .......................... B05B 1/20; B05B 3/12; B62D 33/063

[52] U.S. Cl. ...................................... 239/77; 239/151; 239/167; 239/169; 239/170; 239/175; 239/176; 180/89.13

[58] Field of Search ................ 239/77, 151, 167, 169, 239/170, 172, 175, 176, 290, 295, 299; 280/6.11, 6.12; 180/89.13, 89.12; 56/10.1, 16.8, 14.1, 11.9, DIG. 10, DIG. 11, 208, 10.2

[56] References Cited

U.S. PATENT DOCUMENTS 2,976,647 3/1961 Pickrell .
3,472,454 10/1969 Blue et al. ............................ 239/77
3,666,178 5/1972 Crimmins et al. .
3,670,963 6/1972 Stroebel et al. ....................... 239/77
3,721,077 3/1973 van der Lely .................. 180/89.13
3,804,332 4/1974 Welch .
4,275,800 6/1981 Batzel ............................. 180/89.13
4,583,319 4/1986 Wolff et al. .
4,927,080 5/1990 Alsing ................................. 239/77

FOREIGN PATENT DOCUMENTS 16787-00 4/1987 Israel .

*Primary Examiner*—Andres Kashnikow
*Assistant Examiner*—Karen B. Merritt
*Attorney, Agent, or Firm*—Fleit, Jacobson, Cohn, Price, Holman & Stern

[57] ABSTRACT

A crop spray apparatus is provided having controls for varying the height of a spray device and an operator's cab, which are pivotally mounted on opposite sides of a drive assembly. The controls are located in the operator's cab for continuing control of changes in height of the spray device and the operator's cab from the operator's cab while the drive assembly is moving the apparatus and while simultaneously spraying. By this control, both high and low level crops may be sprayed continuously without need for stopping operation of the crop spray apparatus to vary the height of the equipment.

12 Claims, 5 Drawing Sheets

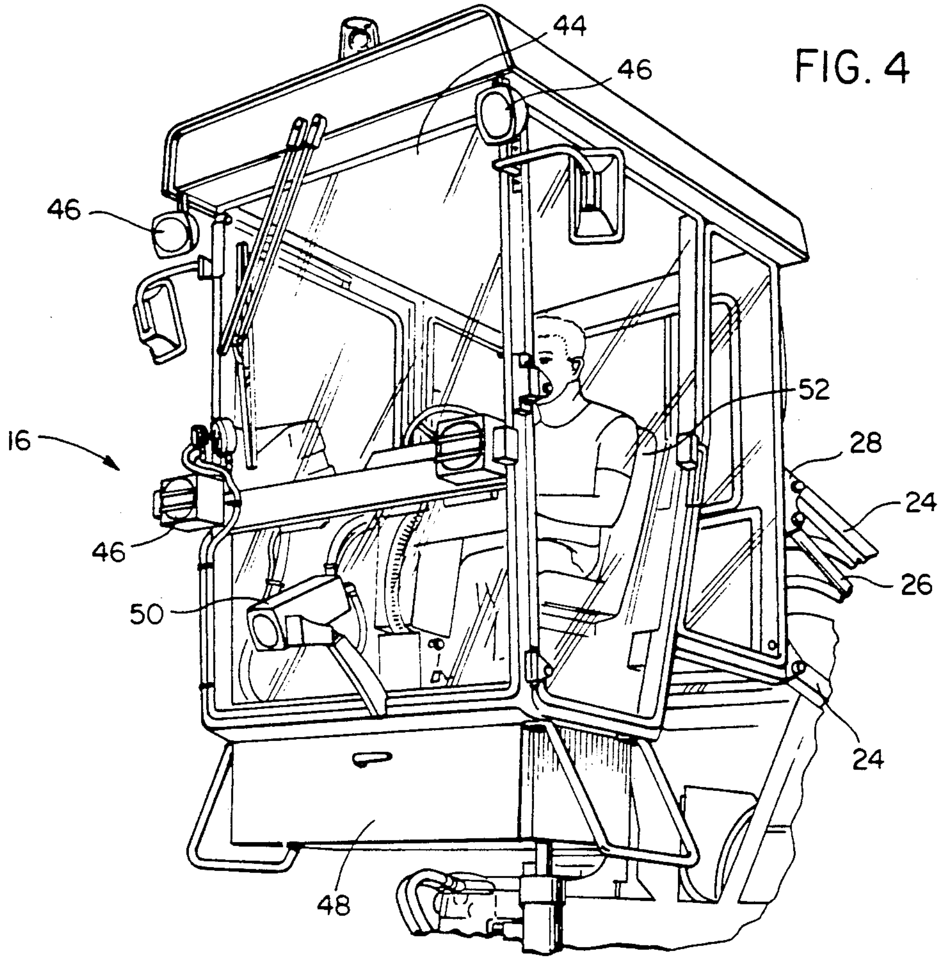
FIG. 4
FIG. 5
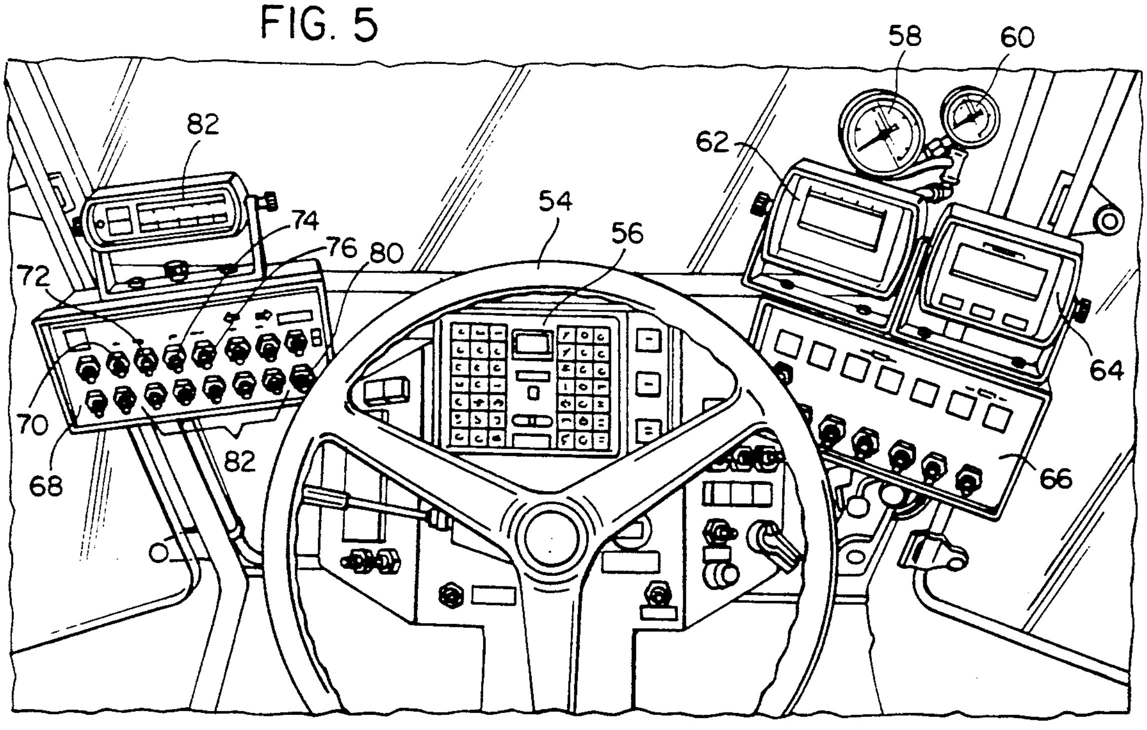

CROP SPRAY APPARATUS HAVING INDEPENDENTLY CONTROLLED DRIVE ASSEMBLY, OPERATOR'S CAB AND SPRAY DEVICE

FIELD OF THE INVENTION

This invention relates to a crop spray apparatus. The spray apparatus includes a drive system onto which are pivotally mounted an operator's cab and a spraying device. The height of the operator's cab and spraying device are independently controlled to be varied according to the height of a crop to be sprayed.

BACKGROUND OF THE INVENTION

There are many different types of commercially available crop spraying devices. Traditionally, these devices are mounted onto the rear end of a standard farm tractor. The controls for the spray device are mounted directly on the spray device and after manually initiating operation of the spraying device, the operator begins driving the tractor which carries the spray device. For any adjustments of the spray arrangement, the tractor must be stopped and the spray device manually altered.

Most spray devices distribute small droplets of chemicals. These small droplets provides coverage of the crop but are prone to drift in windy conditions so as to leave untreated areas of a field.

In spraying devices providing large droplets of chemicals, these droplets are less sensitive to drift but are not as easily retained by leaf surfaces. The large droplets therefore, may run off the target and also may burn the foliage.

SUMMARY OF THE INVENTION

It is an object of the invention to overcome the disadvantages encountered by the use of traditional spraying devices.

The present invention includes three main components: a drive assembly, an operator's cab and a spray device. The operator's cab and spray device are pivotally mounted on the drive assembly for independently varying the height of the operator's cab and the spray device. The drive assembly propels the entire apparatus across the ground. The spray device is activated by control from the operator's cab. The spray device has a maximum working range of 79 feet across.

The drive assembly powers and steers the apparatus as controlled from the operator's cab. A single lever adapts the hydrostatically driven, independent wheels from two-wheel drive for road travel to four-wheel drive for field operation. Further, each wheel is driven by an independent hydrostatic drive unit. One hydrostatic pump controls four separate motors, one motor located at each wheel. A differential lock feature has a unique advantage for travel over muddy or uneven terrain since it will preclude any wheel from spinning due to lack of traction or a lack of contact with the terrain surface.

A hydraulic lift control permits the independent raising and lowering of each of the four wheels so that the unit may maintain a level spraying even when operating on a terraced field where there may be a height variation from six to twelve inches from the left side to the right side of the apparatus. Additionally, the independent hydraulic lift controls for each wheel permits the raising or lowering of the drive assembly at its forward or rear end so that the drive assembly and therefore the entire apparatus may be inclined forward or backward to maintain a level posture, depending on the grade or lay of the terrain.

The operator's cab is almost entirely made of glass for maximum visibility. The operator's cab is lifted hydraulically from a height of 2.2 feet to 7.2 feet above the ground to the bottom of the cab according to an optimum height for spraying of a particular crop.

The spray device which includes two inflated sleeves provides downward air turbulence for overall even distribution of spray during application. The main fan unit which inflates the sleeves is hydraulically driven from the drive assembly. Electronic controls within the operator's cab permit unlimited variation of the fan speed across a continuum of speeds. The operator, therefore, has maximum flexibility to adjust, in any increment, based on wind velocity, side winds, gusts or other wind conditions the force of downward air turbulence assisted, spray application. Additionally, the fan blades are pitch adjustable.

Each inflated sleeve is conically shaped, being wider at its base adjacent the fan, and narrower at its remote distal ends. The conical design allows uniform air pressure throughout circular exit points within the sleeve. Uniform air pressure is produced regardless of the location of each hole with respect to its distance from the main fan unit, even if some of the holes are blocked. The range of air velocity within the sleeve, and through the exiting portals, creates a downward air turbulence adjustable across a continuum, based on fan speed and also by shifting the continuum upward and downward, depending on the setting of the fan pitch.

The spray sleeve creates an air velocity of up to 165 feet per second. The air volume and air velocity are uniform at every outlet along the sleeve. A nozzle pipe is fitted underneath the sleeves, extending parallel to the sleeves. Spray nozzles are spaced ten inches apart on the nozzle pipe and the angle of spray is adjusted in the direction of air flow. Usually the angle of the spray nozzle is set at thirty degrees. Spray droplets are carried to the plant by air turbulence turning the leaves so that spray droplets cover both the top and the lower side of the leaves and their stems as well as air flow impinging upon the ground and directing spray upwards towards the underside of the plant leaves Further, the air stream carrying the spray droplets opens a path through the plants, thus enabling the chemicals to penetrate all the way to the bottom parts of the plants. When operating in windy conditions, air flow currents force down spray droplets at a velocity which overcomes strong winds. As a result, side drift of spray chemicals is significantly reduced.

All spray nozzles of the spray device are controlled by electronic control from the operator's cab. In the event of failure of a spray nozzle, access is permitted to a battery of controls and breakers for ease of access for replacement or diagnostic evaluation of the jet failure. Each spray line is protected by filters to avoid clogging of nozzles.

The drive assembly includes a unique tank agitation system. Each of two stainless steel storage tanks containing liquid to be sprayed is independent and has its own agitation system to prevent settling or inconsistency of spray concentration. Each tank has a separate centrifugal pump and is controlled separately from the operator's cab.

The pumps force liquid to exit through a spray nozzle which is located at each spray location on the sleeves. It is therefore possible to fill one tank with one type of pesticide for one field or an area of a field and fill another tank with another chemical for a different field or another area of the same field.

Additionally, the operator, from within the operator's cab, may switch spraying liquid from tank to tank while the drive assembly is moving the crop spray apparatus in order to achieve proper balance of the apparatus while spraying on a sloped field. The tanks are then operated independently while maintaining consistency and proper concentration due to the tank agitation system of the stainless steel tanks. Each tank holds 220 gallons of fluid and by electronic control from the operator's cab are operated independent of each other.

Each sleeve is independently remotely controlled for movement at an angle from a pivot axis point. This design permits operation at full efficiency with either or both sleeves brought next to the body of the drive assembly, extending parallel to the direction of travel, and providing the possibility of having one sleeve parallel and one sleeve transverse to the direction of travel, permitting maximum flexibility in close quarters or partial segments of a field requiring spray.

Portions of the drive assembly housing are hollow for storing water, oil and fuel tanks. This optimizes the efficiency of storage of materials and lowers the center of gravity for a stabilized load.

The controls for varying the height of the spray device and the operator's cab are located in the operator's cab for continuing control of changes in height of the spray device in the operator's cab while the drive assembly is moving the apparatus and while simultaneously spraying. By this control, both high and low level crops may be sprayed continuously without need for stopping operation of the crop spray apparatus to vary the height of the equipment.

The operator's cab includes a pressurized air system to prevent penetration of harmful spray chemicals into the cab. The cabin air conditioning, orthopaedic seat, and easy to reach control levers, contribute to the comfort of the operator who can adjust hydraulically the cabin height to provide optimum visibility, thus reducing fatigue and resulting in improved output and efficiency.

It is therefore another object of the present invention to provide a crop spray apparatus having an independently controlled drive assembly, operator's cab and spray device.

It is yet another object of the present invention to provide a crop spray apparatus having an independently controlled drive assembly, operator's cab and spray device with the operator's cab and spray device being pivotally mounted on the drive assembly for independent variation in height.

It is yet another object of the present invention to provide a crop spray apparatus having an independently controlled drive assembly, operator's cab and spray device with the operator's cab and spray device being pivotally mounted on the drive assembly for independent variation in height and the drive assembly including hydrostatically driven independent wheels which are variable in height.

It is still yet another object of the present invention to provide a crop spray apparatus having an independently controlled drive assembly, operator's cab and spray device with the operator's cab and spray device being pivotally mounted on the drive assembly for independent variation in height and the drive assembly including hydrostatically driven independent wheels which are variable in height and the control of the drive assembly and spray device being actuable from the operator's cab while the apparatus is moving.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 4 illustrates the operator's cab.

FIG. 5 illustrates the interior of the operator's cab.

DETAILED DESCRIPTION OF THE PREFERRED EMBODIMENTS

Figure 1:
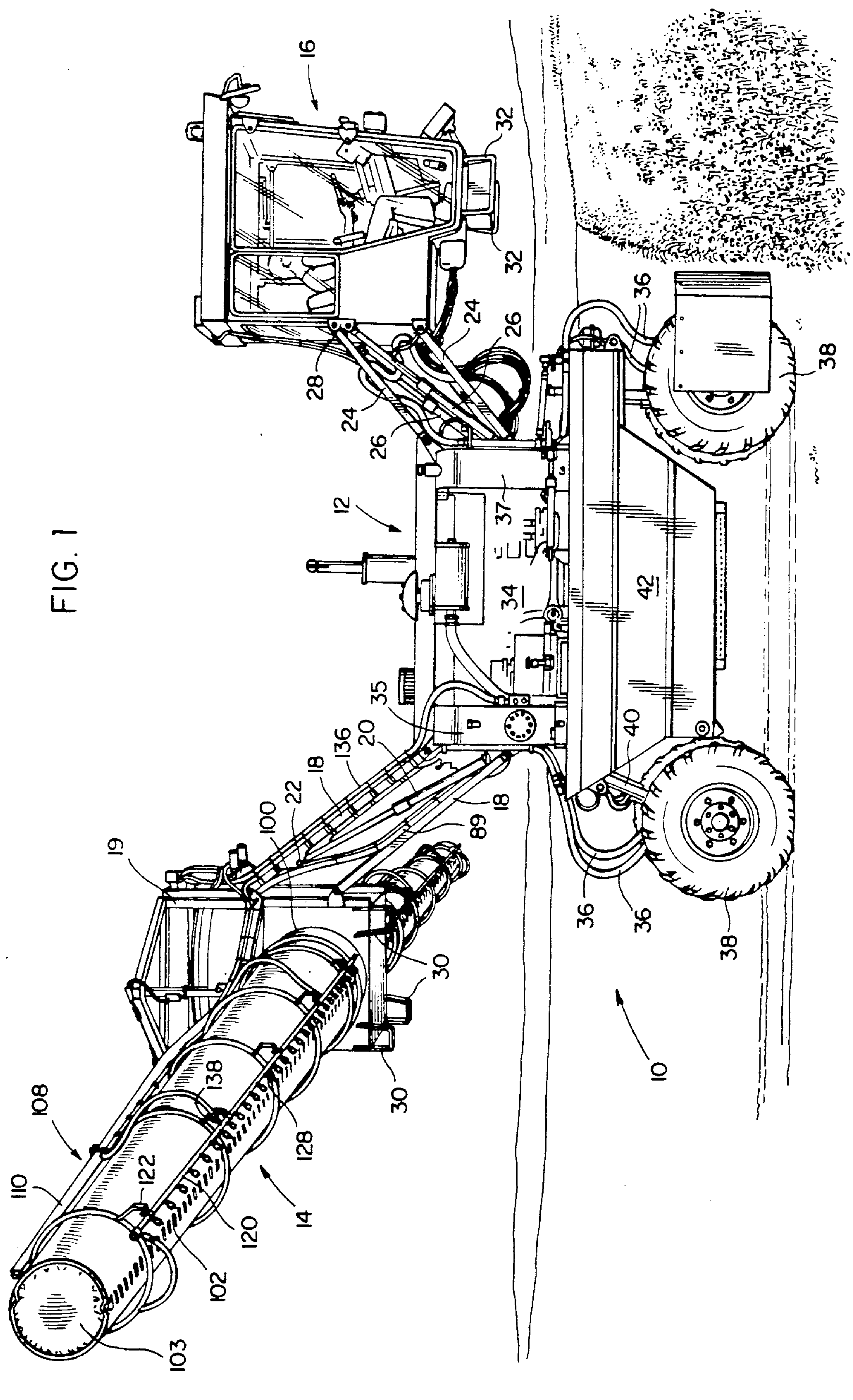
FIG. 1 is a side perspective view of the crop spray apparatus.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
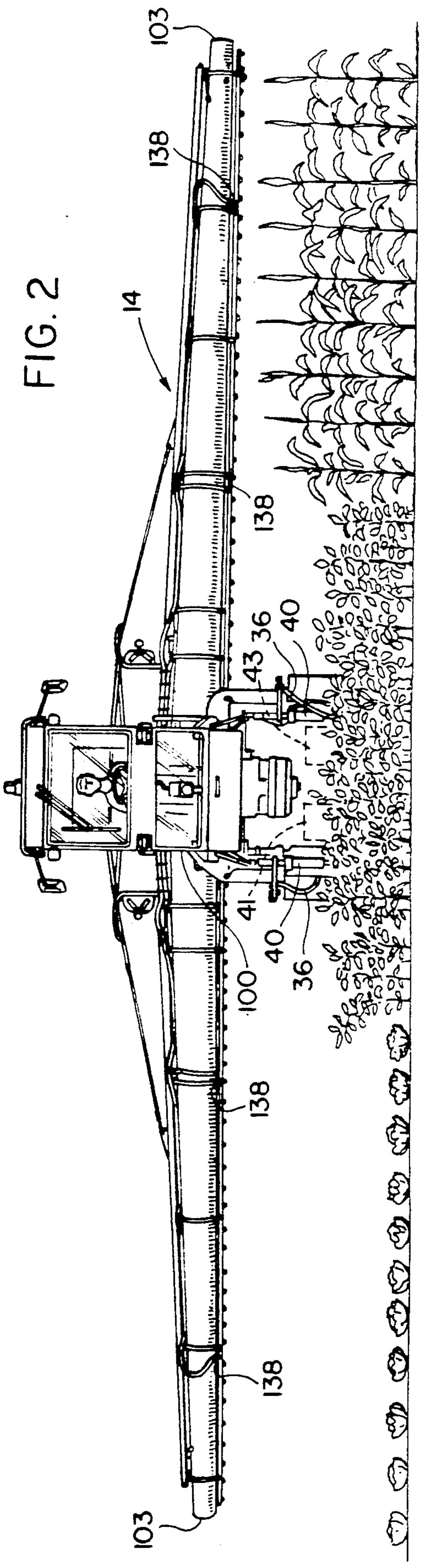
FIG. 2 is a front elevation of the apparatus with extended spray sleeves.
Figure 3:
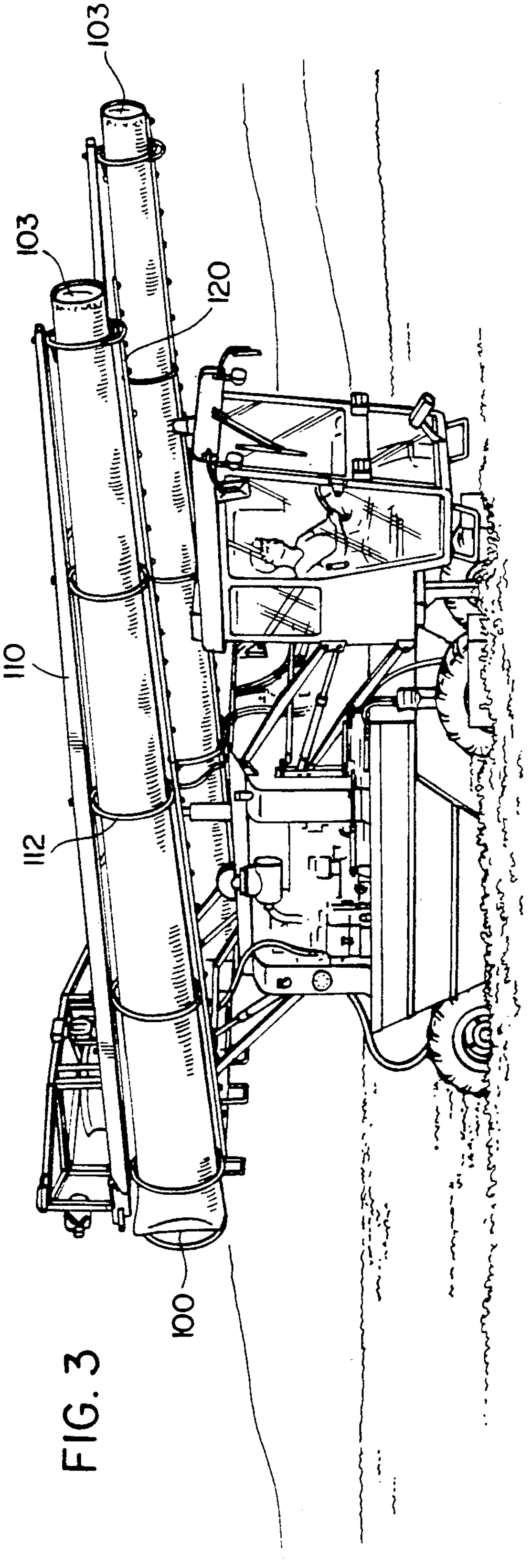
FIG. 3 illustrates the folding of the spray sleeves in a direction of travel of the apparatus.
Figure 6:
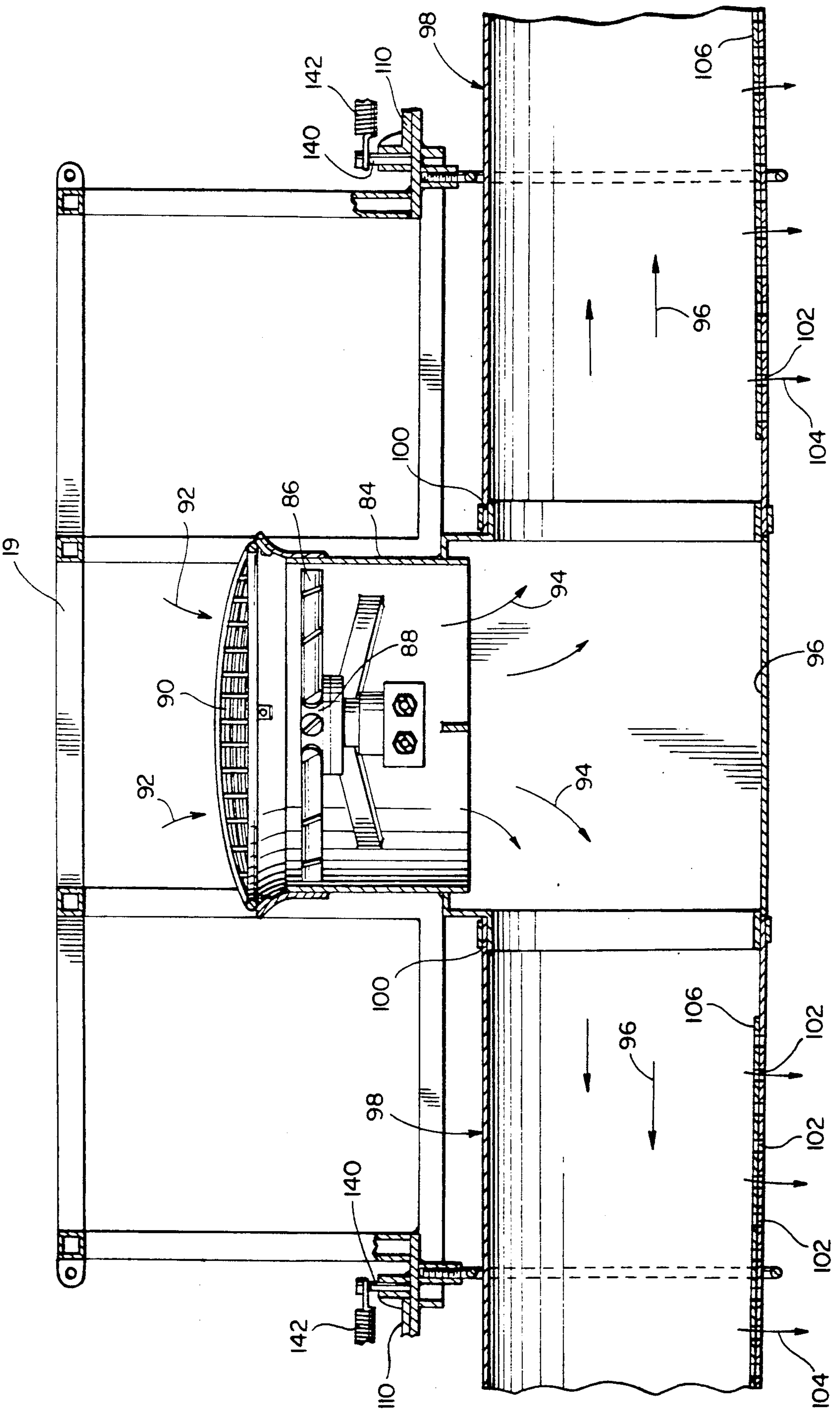
FIG. 6 is a sectional view of the spray sleeves and its drive fan.

With reference to the drawings, and to FIGS. 1 through 3, in particular, a crop spray apparatus embodying the teachings of the subject invention is generally designated as 10. With reference to its orientation in FIG. 1, the crop spray apparatus comprises a drive assembly 12, a spray device 14 and an operator's cab 16.

Four struts 18 are pivotally mounted at one end to the drive assembly 12 and at their opposite end pivotally mounted to a fan support housing 19 of the spray device 14. Two hydraulic piston cylinder assemblies 20 are pivotally connected at one end to the drive assembly and at their opposite end are pivotally connected at a pivot point 22 located on the uppermost of the struts 18. By energization of the hydraulic piston cylinder assemblies 20, the spray device 14 is moved relative to the drive assembly so as to raise or lower the spray device. The spray device is movable between a ground clearance of 1.5 to 11.5 feet, and anywhere in between.

Similarly, four struts 24 are pivotally connected at one end to the drive assembly 12 and at an opposite end pivotally connected to the operator's cab 16. Two hydraulic piston cylinder assemblies 26 are pivotally connected at one end to the drive assembly 12 and at an opposite end pivotally connected to a bracket 28 mounted on the operator's cab 16. By energization of the hydraulic piston cylinder assemblies 26, the operator's cab is raised or lowered relative to the drive assembly. The control for the raising and the lowering of the spray device 14, as well as the raising and lowering of the operator's cab 16, is controlled from within the operator's cab, even while the drive assembly is moving the crop spray apparatus.

At the bottom of the fan housing 19 are located four supports 30 for supporting the spray device 19 on the ground. Similarly, the operator's cab includes two supports 32 for supporting the operator's cab when it is lowered to ground level.

In FIG. 1, the drive motor 34 for the drive assembly 12 is schematically shown. The drive motor may incorporate a known power plant for moving the drive assembly in a forward or reverse direction. One example of a suitable engine is a Deutz turbocharged 160 HP engine. However, the controls for the engine 34 are maintained within the operator's cab 16 for remote control of the engine.

Four hydrostatic lines 36 are connected, one to each tire 38 of the four tires of the drive assembly. The hydrostatic lines are connected between a single hydrostatic pump driven by the engine 34 of the drive assembly and are connected to a separate hydrostatic drive, one at each wheel 38, including a motor, planetary gear and negative braking system.

In addition, each wheel 38 is independently height adjustable by a piston cylinder assembly for each wheel. One such piston cylinder assembly 40 is shown for the rear right wheel in FIG. 1 and for the two front wheels in FIG. 2. By independent actuation of the piston cylinder assemblies 40 from the operator's cab, the level of the drive assembly and thereby the crop spray apparatus is adjusted for inclined slopes from front to rear or for uneven terrain from side to side.

Located between the wheels 38, which are spaced between 72 to 76 inches apart, is a main body having tank housing 42 for housing two stainless steel storage tanks 41 and 43 as shown in dotted lines in FIG. 2, with tank 41 shown in dotted lines in FIG. 1, for spray liquid. The location of the storage tanks between the wheels lowers the center of gravity of the crop spray apparatus and thereby enhances stability of the crop spray apparatus. The pumping of liquid from either of these tanks is achieved by a centrifugal pump which is controlled from the operator's cab so as to transfer a desired liquid to the spray device 14 according to a particular crop desired to be sprayed. The main body of the drive assembly also includes emergency water tank 35, diesel fuel tank 37, battery box 39 and a hydraulic oil reservoir located on the opposite side of the drive assembly from the diesel fuel tank 37.

Also mounted on the drive system is an auxiliary hydraulic system having a gear wheel pump controlled from the operator's cab. The gear wheel pump activates steering, spraying pumps, raising and lowering of the spray device and operator's cab, and folds and unfolds the sleeves of the spray device.

The operator's cabin is the main operator's station. It enables the operator to control and monitor the system's operation while providing protection for the operator during spraying.

The operator's cab is primarily made of glass windows 44 surrounding the operator for a panoramic view of the field to be sprayed. The operator's cab includes work headlights 46 for visibility, a locker 48 for storage of repair tools and replacement filters, a sensor 50 for a spray computer which determines the height and density of the crop to be sprayed to assist the spray device computer to calculate the amount of spray needed.

Adjacent to the seat 52 of the operator are hand controls for the throttle of the engine 34 of the drive assembly along with a travel lever which shifts the transmission for forward or backward travel, a travel mode lever to select one of three positions between road travel (18 miles per hour), normal work travel (10 miles per hour) and differential lock for difficult travel conditions. In addition, a blower operating lever is located adjacent to the seat 52 to regulate the sleeve air pressure by the speed of the fan. Speed is varied proportional to the angle of the lever. When the lever is fully retracted there is no air pressure, when the lever is fully forward, maximum air pressure. Air pressure is variably regulated between movement of the lever towards the forward and rearward positions.

An operator's view of the controls of the crop spray apparatus is shown in FIG. 5. Beyond the steering wheel 54 for the drive assembly is located an electronic control board 56 which provides an indication of engine temperature, engine oil pressure, fuel percentage, air filter condition, park brake setting, hydraulic oil level, battery charge, hydraulic oil temperature, transmission temperature, fan charge pressure, transmission charge pressure, transmission oil filter condition, fan oil filter condition and oil filter condition. Indicator lights are activated upon exceeding predetermined thresholds or indication of a malfunction.

Air pressure gauge 58 indicates air pressure of the sleeve of the spray device in millimeters/$H_2O$ and measures air velocity in feet per second. Spray pressure gauge 60 shows the pressure of the spraying system. Control console 62 displays the condition of the liquid sprayer control system. Display console 64 displays an indication of the operation of the pressure/flow monitoring system. Boom control panel 66 includes a suction pump main switch to enable operation of an auxiliary suction pump, a main switch for the spray solenoids, boom section switches to open and close the boom spray valves along the boom sections in addition to windshield wiper and light controls.

Hydraulic control panel 68 includes switches 70 and 72 to control the raising and lowering by piston cylinder assembly 40 of each of the front wheels Switches 74 and 76 similarly control the cylinder assembly 40 for the independent raising and lowering of each of the rear wheels. Switch 78 controls movement of liquid from storage tank to storage tank so as to control the distribution of weight in the drive assembly. Switch 80 is activated to show the level of the left or right tank on the tank level indicator 82.

The five switches bracketed by bracket 82 are for controlling the spray device. The central switch is used to raise and lower the spray device whereas the two switches on each of the left and right of the central switch are used to open and close the sleeve sections located on opposite sides of the fan housing 19.

Located within the fan frame 19 is a fan housing 84 with fan blades 86 mounted on a central hub 88. The fan blades include a sweep of 36 inches and are driven by a hydrostatic pump and hydraulic pump mounted on the drive system and controlled from the operator's cab. Rotation of the fan is driven by hydraulic line 89 connected to the drive assembly and controlled from the operator's cab for speed of rotation.

Air is sucked in by fan blades 86 through screen 90 in the direction of arrows 92. The movement of air is such that the air is moved below the fan blades in the direction of arrows 94 into a central chamber 96. A maximum air blast output of 66 $ft^3/S$ is achieved.

Located on opposite sides of the chamber 96 are two reinforced PVC sheeting sleeves 98. The force of the air moving in the direction of arrows 96 inflates the sleeves 98 into their conically tapering rigid form as expanded by air pressure. The end 100 of each sleeve 98 connected to the chamber 96 is wider than a distal end 103 of each sleeve as shown in FIGS. 1 through 3.

Spaced along a lowermost edge of each sleeve are openings 102 through which air passes in the direction of arrows 104. Along the lowermost edge of the sleeves is a reinforcing sheet 106 which also includes openings aligned with the openings 102 in the sleeves 98.

Figure 7:
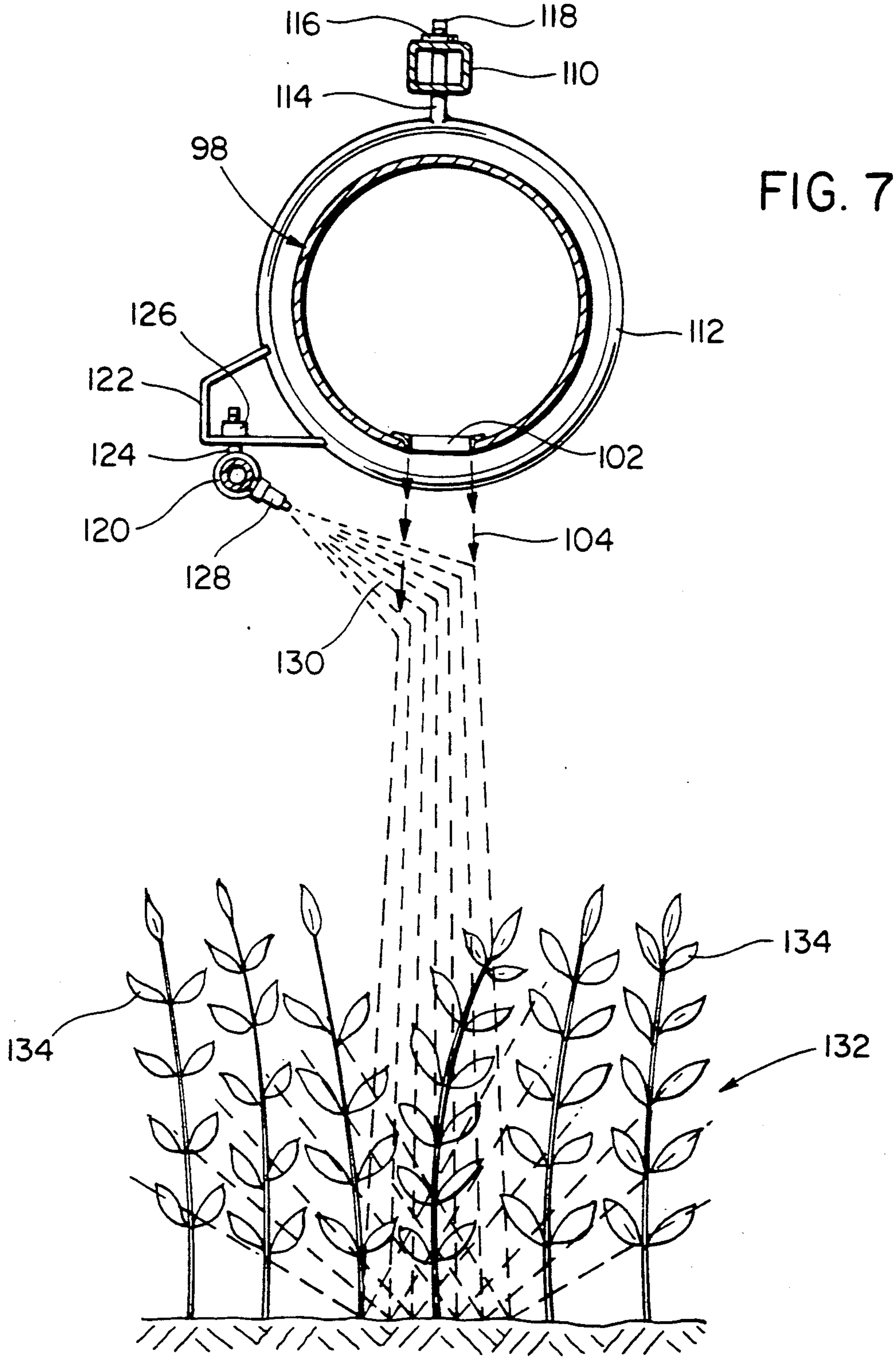
FIG. 7 is a sectional view through the spray sleeve and an associated spray nozzle.

The sleeves 98 are supported within a support frame structure 108 which includes a rectangular longitudinally extending support bar 110 located above the sleeves. Secured to the support bar 110, and spaced longitudinally along the support bar 110, are support hoops 112 which encircle the sleeves 98. The support hoops 112 are secured to the support bar by a post 114 extending through the support bar and secured by a washer 116 and nut 118 as shown in FIG. 7.

Extending longitudinally along the sleeves 98, at a lower portion of the sleeves, and laterally offset from the openings 102 of the sleeve, is located spray bar 120 made of stainless steel and which is hollow for passage of liquid therethrough. The spray bar 120 is supported by C-shaped brackets 122 which are secured to the support hoops 112. A post 124 extends from the spray bar and passes through the bracket 122 and is secured to the bracket 122 by a nut 126.

Spaced along the spray bar 120 are a plurality of nozzles 128 for spraying a fine mist of liquid. The spray nozzles are positioned so as to spray a fine mist of liquid into the path of air 104 passing through openings 102 of the sleeves 98. Typically the angle of the spray from the spray nozzles 128 is 30 to 35 degrees with respect to the vertically, downwardly movement of the air from the sleeves 98 as shown in FIG. 7.

Upon contacting of the fine mist spray 130 from the spray nozzles with the air flow 104, the direction of the spray 130 is changed to follow in the path of the air exiting from the openings 102 of the sleeve 98. Crops 132 located below the sleeves 98 are moved by the force of the air directed towards them to allow penetration of the air, which now includes a fine mist spray of liquid. The leaves 134 of the crops 132 are moved by the force of the air such that the underside of the leaves and stems along with the top side of the leaves are contacted by the spray from the nozzles 128. In addition, air contacting the ground and deflecting in all directions further moves the leaves and plants for maximized contact of the spray 130 with all surfaces of the crops.

Spray lines 136 emanating from the liquid storage tanks in the housing 42 of the drive assembly include fluid pumped to the spray line 120 as shown connected to the spray line 120 at at least two locations 138 spaced along the spray bar 120 of each sleeve 98.

Each of the support bars 110 are pivotally connected to the fan frame 19 by pivot pin 140 and spring 142 for movement of each of the sleeves 98 independently of the other so as to shift one or both of the sleeves into a direction parallel with the path of travel of the drive assembly as shown in FIG. 3. In the position shown in FIG. 3, spraying of limited areas of crops is achieved. If only one sleeve is extended, spraying of the peripheral edges of a field may be accomplished so as to avoid wasting of spray beyond the perimeters of a field.

Having described, the invention, many modifications thereto will become apparent to those skilled in the art to which it pertains without deviation from the spirit of the invention as defined by the scope of the appended claims.

We claim:

1. A crop spray apparatus comprising:

a drive assembly for moving the apparatus forward and backward, said drive assembly including a tank housing having at least two spray liquid storage tanks, an operator's cab pivotally mounted on said drive assembly for variance in height, and a spray device pivotally mounted on said drive assembly for variance in height, said spray device including a fan housing and two spray sleeve means pivotally mounted on said fan housing for movement between a direction parallel to a direction of travel of said drive assembly and a direction transverse to the direction of travel of said drive assembly, said spray sleeve means being connected to said at least two spray liquid storage tanks for controlled spraying by said spray device, said operator's cab and said spray device being pivotally mounted on opposite sides of said drive assembly, said spray device and said operator's cab being independently height controlled from said operator's cab along with control of spraying of said spray sleeve means of said spray device.

2. A crop spray apparatus as claimed in claim 1, wherein said spray sleeve means includes two spray sleeves inflated by air turbulence created by a fan, and a speed of said fan is controlled from the operator's cab.

3. A crop spray apparatus as claimed in claim 2, wherein said spray sleeves include air outlets for passage of an air stream, and spray nozzles connected to a spray line mounted adjacent to said spray sleeves for spraying a liquid into the air stream passing through said air outlets for uniform coating of crops with the sprayed liquid.

4. A crop spray apparatus as claimed in claim 1, wherein pumps for removing the liquid from the spray liquid storage tanks are controlled from the operator's cab.

5. A crop spray apparatus as claimed in claim 1, wherein said drive assembly includes a body and wheels adjustably controlled for varying a spacing of the wheels from the body and controlling the spacing distance between the wheels and the body from the operator's cab.

6. A crop spray apparatus comprising:

a drive assembly having a main body and four wheels for driving the apparatus, said main body including spray liquid storage tanks, an operator's cab, first struts pivotally connected to said operator's cab and said drive assembly, first means for raising and lowering said operator's cab, a spray device, said spray device including a fan housing and two spray sleeve means for spraying of liquid on crops, said two spray sleeve means being pivotally mounted on said fan housing and said two spray sleeve means being connected to said spray liquid storage tanks, second struts pivotally connected to said spray device and said drive assembly, second means for raising and lowering said spray device, said operator's cab and said spray device being pivotally mounted on opposite sides of said drive assembly, said first means, said second means, said drive assembly and said spray device including said two spray sleeve means being controlled from said operator's cab.

7. A crop spray apparatus as claimed in claim 6, wherein said spray sleeve means includes two spray sleeves inflated by air turbulence created by a fan, and a speed of said fan is controlled from the operator's cab.

8. A crop spray apparatus as claimed in claim 7, wherein said two spray sleeves taper inwardly in a direction extending away from said fan.

9. A crop spray apparatus as claimed in claim 8, wherein said spray sleeves include air outlets for passage of an air stream produced by said fan.

10. A crop spray apparatus as claimed in claim 9, wherein a spray line anchored to said fan housing an adjacent to said spray sleeve means includes a plurality of spray nozzles for projecting a liquid spray into the air stream passing through said air outlets.

11. A crop spray apparatus as claimed in claim 10, wherein said spray liquid storage tanks in said main body feed liquid to said spray line by pumps, said pumps being controlled from said operator's cab.

12. A crop spray apparatus as claimed in claim 6, wherein said wheels are adjustable in spacing from the main body as controlled from the operator's cab.

* * * * *